US011667558B2

(12) United States Patent
Cook et al.

(10) Patent No.: US 11,667,558 B2
(45) Date of Patent: Jun. 6, 2023

(54) BURNER DESIGN FOR PARTICLE GENERATION

(71) Applicant: CORNING INCORPORATED, Corning, NY (US)

(72) Inventors: Laura Beth Cook, Corning, NY (US); Curtis Robert Fekety, Corning, NY (US); Yunfeng Gu, Painted Post, NY (US); Dale Robert Powers, Painted Post, NY (US); Christopher Scott Thomas, Horseheads, NY (US); Srinivas Vemury, Painted Post, NY (US); Fei Xia, New York, NY (US); Chunfeng Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 728 days.

(21) Appl. No.: 16/740,903

(22) Filed: Jan. 13, 2020

(65) Prior Publication Data
US 2020/0148579 A1 May 14, 2020

Related U.S. Application Data

(62) Division of application No. 15/455,776, filed on Mar. 10, 2017, now Pat. No. 10,562,804.
(Continued)

(51) Int. Cl.
*C03B 19/14* (2006.01)
*C03B 37/018* (2006.01)
(Continued)

(52) U.S. Cl.
CPC .... *C03B 37/01815* (2013.01); *C03B 19/1407* (2013.01); *C03B 19/1423* (2013.01);
(Continued)

(58) Field of Classification Search
CPC ............ C03B 19/1407; C03B 19/1423; C03B 37/01807; C03B 37/01815; C03B 37/012;
(Continued)

(56) References Cited

U.S. PATENT DOCUMENTS 3,741,796 A * 6/1973 Walker ................ C04B 41/5025
65/17.4
4,501,601 A 2/1985 Haupt
(Continued)

FOREIGN PATENT DOCUMENTS

JP 60122737 A 7/1985
WO 2016138052 A1 9/2016

OTHER PUBLICATIONS

Making of fused quartz and fused silica [online]. Heraeus, 2022 [retrieved Oct. 13, 2022]. Retrieved from the Internet: <URL: https://www.heraeus.com/en/hca/fused_silica_quartz_knowledge_base_1/production_process_1/makingoffusedsilica_hca.html>. (Year: 2022).*

(Continued)

*Primary Examiner* — Erin Snelting
(74) *Attorney, Agent, or Firm* — Robert L. Carlson

(57) ABSTRACT

A method of producing bi-modal particles includes the steps of igniting a first precursor gas using a primary burner thereby producing a first plurality of particles of a first size, fluidly transporting the first plurality of particles down a particle tube, igniting a second precursor gas using a secondary burner thereby producing a second plurality of particles of a second size, flowing the second plurality of particles into the first plurality of particles, and capturing the first and second plurality of particles.

13 Claims, 7 Drawing Sheets

Related U.S. Application Data

(60) Provisional application No. 62/310,309, filed on Mar. 18, 2016.

(51) Int. Cl.
    *C03B 37/014*     (2006.01)
    *C03C 13/04*     (2006.01)
    *C03C 3/06*     (2006.01)
    *C03B 37/012*     (2006.01)

(52) U.S. Cl.
CPC .... *C03B 37/0142* (2013.01); *C03B 37/01282* (2013.01); *C03B 37/01406* (2013.01); *C03C 3/06* (2013.01); *C03C 13/045* (2013.01); *C03B 2201/12* (2013.01); *C03B 2201/20* (2013.01); *C03B 2201/28* (2013.01); *C03B 2201/30* (2013.01); *C03B 2207/20* (2013.01); *C03B 2207/36* (2013.01); *C03B 2207/50* (2013.01); *C03C 2203/40* (2013.01)

(58) Field of Classification Search
CPC .......... C03B 37/0128; C03B 37/01282; C03B 37/014; C03B 37/01406; C03B 37/01413; C03B 37/0142; C03B 37/018
See application file for complete search history.

(56) References Cited

U.S. PATENT DOCUMENTS

| | | |
|---|---|---|
| 4,529,532 A | 7/1985 | Gliem et al. |
| 5,185,020 A | 2/1993 | Satoh et al. |
| 5,244,485 A | 9/1993 | Hihara et al. |
| 5,352,259 A | 10/1994 | Oku et al. |
| 5,599,371 A | 2/1997 | Cain et al. |
| 5,922,100 A | 7/1999 | Cain et al. |
| 6,099,749 A | 8/2000 | Boes et al. |
| 6,312,656 B1 | 11/2001 | Blackwell et al. |
| 6,699,808 B1 | 3/2004 | Schwertfeger et al. |
| 6,723,435 B1 | 4/2004 | Horne et al. |
| 8,038,971 B2 | 10/2011 | Davis et al. |
| 8,578,736 B2 | 11/2013 | Dawes et al. |
| 8,853,317 B2 | 10/2014 | Sanchez Garcia et al. |
| 2004/0216486 A1 | 11/2004 | Schwertfeger et al. |
| 2006/0165898 A1 | 7/2006 | Kodas et al. |
| 2010/0059704 A1 | 3/2010 | Davis et al. |
| 2010/0107700 A1* | 5/2010 | Dawes .............. C03B 37/01282 65/404 |
| 2011/0059837 A1 | 3/2011 | Werdecker |
| 2012/0142837 A1 | 6/2012 | Garcia et al. |
| 2012/0279259 A1* | 11/2012 | Yamada .............. C03B 37/0142 65/414 |
| 2016/0251252 A1 | 9/2016 | Clinton et al. |

OTHER PUBLICATIONS

S. Lampenscherf et al., "Stress Development Due to Capillary Condensation in Powder Compacts: A Two-Dimensional Model Study", J. Am. Ceram. Soc., 83 [6] 13331340, (2000).
International Search Report and Written Opinion PCT/US2017022666 dated Jun. 2, 2017.

* cited by examiner

BURNER DESIGN FOR PARTICLE GENERATION

This application is a divisional and claims the benefit of priority under 35 U.S.C. § 120 of U.S. patent application Ser. No. 15/455,776, filed on Mar. 10, 2017, which claims the benefit of priority under 35 U.S.C. § 119 of U.S. Provisional Application Ser. No. 62/310,309 filed on Mar. 18, 2016 the content of which is relied upon and incorporated herein by reference in its entirety.

BACKGROUND

The present invention generally relates to methods and apparatuses for forming particles, and more particularly, relates to the simultaneous production of particles having a bimodal size distribution.

Conventional manufacturing processes for producing optical fibers preforms include growing the preform by utilizing an outside vapor deposition technique where silica soot particles are sprayed onto the preform as it is rotated. Advances in the production of optical fiber preforms now make it capable to produce a plurality of silica soot particles for later pressing into a green body. The green body may later be consolidated into an optical fiber preform.

SUMMARY

According to one embodiment, a method of producing bi-modal particles includes the steps of igniting a first precursor gas using a primary burner thereby producing a first plurality of particles of a first size, fluidly transporting the first plurality of particles down a particle tube, igniting a second precursor gas using a secondary burner thereby producing a second plurality of particles of a second size, flowing the second plurality of particles into the first plurality of particles, and capturing the first and second plurality of particles.

According to another embodiment a burner system includes a primary burner positioned within a particle tube. The primary burner is configured to produce a first plurality of particles. A secondary burner is positioned within a secondary tube. The secondary burner is configured to produce a second plurality of particles. The particle tube and the secondary tube are fluidly connected such that the first plurality of particles and the second plurality of particles are mixed. A bag house is configured to collect the first and second plurality of particles.

According to yet another embodiment, a method of forming an optical fiber preform for making an optical fiber includes steps of igniting a gas using a primary burner thereby producing a first plurality of particles of a first size, igniting a second gas using a secondary burner thereby producing a second plurality of particles of a second size, flowing the second plurality of particles into the first plurality of particles, capturing the first and second plurality of particles, and pressing the first and second plurality of particles into an optical fiber preform.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
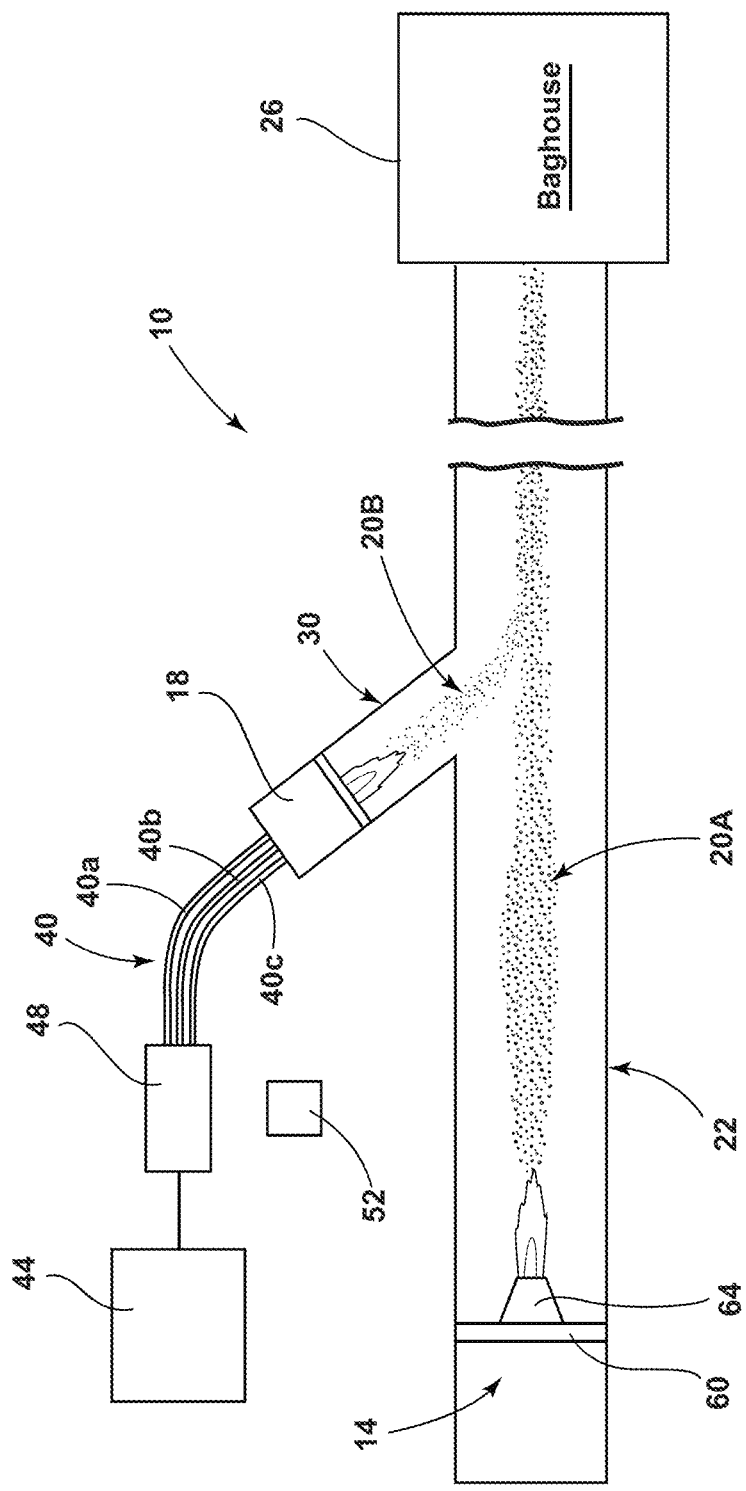
FIG. 1 is a schematic diagram illustrating a particle production system, according to one embodiment.

Reference will now be made in detail to the present embodiments, examples of which are illustrated in the accompanying drawings. Whenever possible, the same reference numerals will be used throughout the drawings to refer to the same or like parts.

For purposes of description herein, the terms "upper," "lower," "right," "left," "rear," "front," "vertical," "horizontal," and derivatives thereof, shall relate to the disclosure as oriented in FIG. 1, unless stated otherwise. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting unless the claims expressly state otherwise. Additionally, embodiments depicted in the figures may not be to scale or may incorporate features of more than one embodiment.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring now to FIG. 1, depicted is schematic representation of a particle production system 10 configured to produce a plurality of particles for collection. The particle production system 10 includes a plurality of burners, each burner configured to generate a plurality of particles through combustion of a precursor gas (i.e. a gas precursor which is used to form the constituents of the particles). In the depicted embodiment, the particle production system 10 includes a primary burner 14 and a secondary burner 18. It will be understood that the particle production system 10 may be scaled up to include more than one primary burner 14 or more than one secondary burner 18. Additionally, the particle production system 10 may include a greater number of secondary burners 18 than primary burners 14, or vice versa. As explained in greater detail below, the primary burner 14 is configured to produce a first plurality of particles 20A and the secondary burner 18 is configured to produce a second plurality of particles 20B. In various embodiments, the first and second pluralities of particles 20A, 20B may have different particle sizes, distributions of sizes, compositions, morphologies and/or quantities produced.

In the depicted embodiment of the particle production system 10, the primary burner 14 is coupled to a particle tube 22 configured to transport the first plurality of particles 20A generated by the primary burner 14 to a baghouse 26. The secondary burner 18 is positioned on a secondary tube 30 which is fluidly connected with the particle tube 22 such that the second plurality of particles 20B generated by the secondary burner 18 may flow into the stream of the first plurality of particles 20A generated by the primary burner 18. Although the secondary burner 18 is depicted as downstream of the primary burner 14, it will be understood that the primary burner 14 may be positioned downstream of the secondary burner 18. As explained above, the first and second pluralities of particles may have different particle sizes (e.g., diameter or longest length), distributions of sizes, compositions, morphologies and/or quantities produced. For example, the differences in properties of the first and second particles may lead to the soot particles collected in the baghouse 26 to have a bi-modal distribution in size and/or morphology. In another example, the weight percentage of the second plurality of particles 20B in the mixture of first and second plurality of particles 20A, 20B may be greater than about 1%, 2%, 3%, 4%, 5%, 6%, 7%, 8%, 9%, 10%, 25%, 50%, 75%, 90% or greater than about 99%. The baghouse 26 is configured to allow an exhaust stream from the primary and secondary burners 14, 18 to pass though it while collecting the first and second plurality of particles 20A, 20B. The baghouse 26 may include a plurality of modules incorporating filter bags. The exhaust carrying the first and second pluralities of particles 20A, 20B is passed through the filter bags which collects the particles 20A, 20B, but allows the exhaust gas to pass through and expelled.

Extending from the secondary burner 18 is a plurality of gas lines 40 which fluidly connect a gas supply 44 with the secondary burner 18. The plurality of gas lines 40 include a shield gas line 40A, a precursor gas line 40B and a premix line 40C. The gas supply 44 may include a plurality of gas sources configured to provide a shield gas, a precursor gas, a combustible gas mixture, and all the constituents thereof as explained in greater detail below. The plurality of gas lines 40 may be coupled to one or more gas flow restrictors 48. The flow restrictors 48 may include one or more thermal mass flow controllers configured to control the flow rate of one or more of the constituents of the a shield gas, a precursor gas and/or a combustible gas mixture. In some embodiments, the flow restrictor 48 may include upwards of seven or more thermal mass flow controllers (e.g., one for each constituent of the shield gas, a precursor gas and/or a combustible gas mixture). The gas flow restrictors 48 may be controlled by a controller 52 to limit the amount of pressure or flow rate of gas that reaches the secondary burner 18 from the gas supply 44. The controller 52 may be electrically coupled to one or more temperature and pressure sensors positioned along the gas lines 40 and within the secondary burner 18 and configured to alter the individual flow rates of the gas lines 40 to optimize the performance of the burner 18. It will be understood that the primary burner 14 may include a similar gas supply, flow restrictor and gas line as that described in connection with the secondary burner 18.

Figure 2:
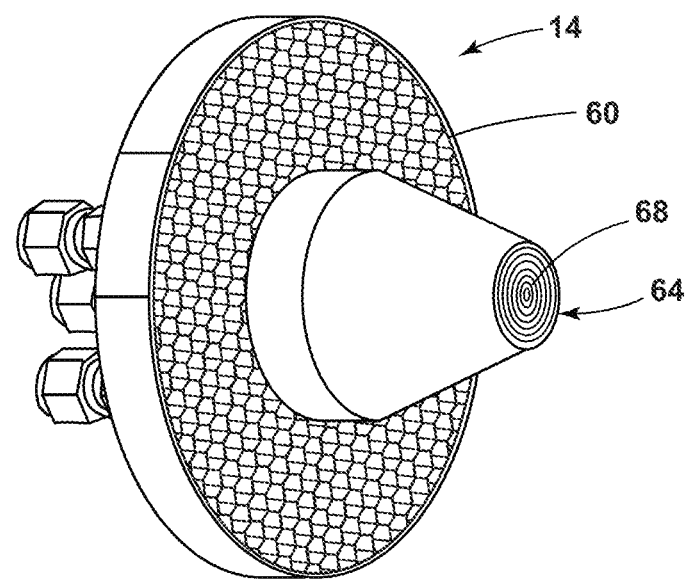
FIG. 2 depicts a top perspective view of a primary burner of the particle production system, according to one embodiment.

Referring now to FIG. 2, the primary burner 14 is configured to produce the first plurality of particles 20A through the combustion of the precursor gas. In the depicted embodiment, the primary burner 14 includes a honeycomb structure 60 and a nozzle 64. The honeycomb structure 60 may provide gas turbulence to a carrier gas passed through the honeycomb structure 60. The nozzle 64 includes a plurality of substantially concentric tubes 68 through which a plurality of gases may flow. For example, the centermost tube may pass a precursor gas mixture which may include a particle precursor compound (e.g., octamethylcyclotetrasiloxane, silicon tetrachloride, tetraethyl orthosilicate, etc.), an oxidizer (e.g., diatomic oxygen, organic oxidizers, etc.) and a combustible gas (e.g., hydrogen, natural gas, methane, etc.). Each of the concentric tubes 68 may pass a separate gas (e.g., diatomic oxygen, methane, diatomic nitrogen, carrier/shield gas) or a combination of gasses. Combustion and/or heating of the precursor gas proximate the nozzle 64 creates the first plurality of particles 20A in a soot or gaseous like state suspended in the combustion exhaust and the carrier gas. The expansion of the gasses during combustion and flow of the carrier gas then carry the first plurality of particles 20A in a soot stream down the particle tube 22 toward the secondary burner 18 and the baghouse 26. The first plurality of particles 20A may exhibit a D50 diameter of greater than about 25 nm, 30 nm, 40 nm, 50 nm, 60 nm, 70 nm, 85 nm, 90 nm, 100 nm or greater than about 110 nm. D-values are used to describe particle size distributions. A D-value can be thought of as a "mass division diameter." It is the diameter which, when all particles in a sample are arranged in order of ascending mass, divides the sample's mass into specified percentages. The percentage mass below the diameter of interest is the number expressed after the "D." Thus the D50 diameter of a collection of particle samples is the diameter at which 50% of a sample's mass is composed of smaller particles. The D50 is also known as "mass median diameter" as it divides the sample equally by mass. Depending on the precursor gas used, the first plurality of particles 20A may be composed of silicon, carbon, organics and/or other compounds. In an exemplary embodiment, the first plurality of particles 20A may be formed of $SiO_2$. In some embodiments, the precursor gas may include a doping agent (e.g., rare earth ions or halogens) such that the first plurality of particles 20A may be doped.

Figure 3:
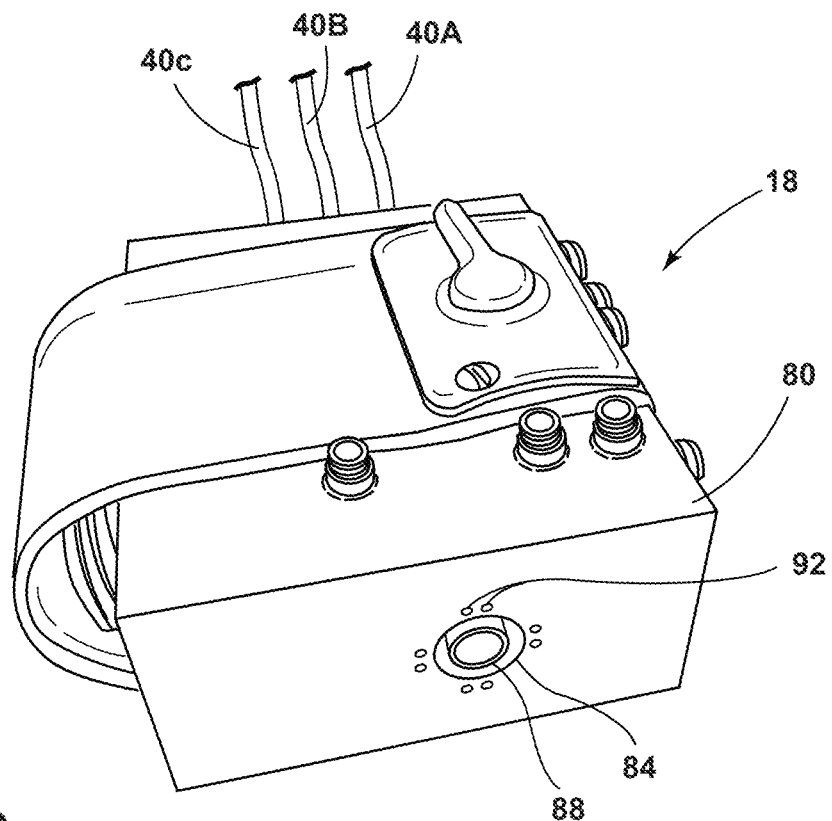
FIG. 3 depicts a top perspective view of a secondary burner of the particle production system, according to one embodiment.

Referring now to FIG. 3, once produced, the first plurality of particles 20A (FIG. 1) travel through the particle tube 22 (FIG. 1) in a soot or gaseous state toward the secondary burner 18. The secondary burner 18 may be a different construction than that of the primary burner 14 (FIG. 2). The secondary burner 18 includes a body 80 defining an annulus 84 through which a precursor tube 88 extends. In the depicted embodiment, the precursor tube 88 may extend coaxially with the annulus 84, but in other embodiments may be off centered. Defined by the body 80, and disposed around the annulus 84, is a plurality of pilot holes 92. In the depicted embodiment, the body 80 defines four groupings of two pilot holes 92, but in various embodiments may include more than eight or less than eight pilot holes 92 in any configuration (e.g., grouped or equally spaced). In one embodiment, the pilot holes 92 may have a diameter of about 0.04 in (1.02 mm), the precursor tube 88 may have a diameter of about 0.25 in (6.35 mm). The annulus 84 may have a diameter of about 0.348 in (8.84 mm). The pilot holes 92 may have a center-to-center spacing from the precursor tube 88 of about 0.22 in (5.59 mm). In the depicted embodiment, each grouping of pilot holes 92 may have a center-to-center distance of about 0.08 in (2.03 mm).

The pilot holes 92 are configured to pass a combustible gas mixture there through which may be ignited. The combustible gas mixture may include diatomic oxygen, diatomic hydrogen and a flammable organic gas (e.g., natural gas or methane). The combustible gas mixture may be regulated and mixed in the gas flow restrictor 48. The combustible gas mixture may have a diatomic oxygen flow rate of between about 0.1 standard liters per minute (SLPM) and about 1.0 SLPM, or between about 0.4 SLPM and about 0.6 SLPM. The combustible gas mixture may have a diatomic hydrogen flow rate of between about 0.1 SLPM to about 2.0 SLPM, or between about 1.00 SLPM to about 1.6 SLPM. The flammable organic gas may have a flow rate of between about 0.1 SLPM and about 0.2 SLPM. In one example, the premix may have 0.175 SLPM of methane, 1.05 SLPM of diatomic hydrogen and 0.5 SLPM of diatomic oxygen. In another example, the premix may have 0.175 SLPM of methane, 1.072 SLPM of diatomic hydrogen and 0.455 SLPM of diatomic oxygen. In yet another example, the premix may have 0.175 SLPM of methane, 1.072 SLPM of diatomic hydrogen and 0.455 SLPM of diatomic oxygen. It will be understood that the above ranges on flow rates are disclosed for a test scale apparatus and that the scale of the premix mixture may be increased with approximately the same ratio disclosed, or with varying ratios, without departing from the spirit of the disclosure.

The precursor tube 88 of the secondary burner 18 is configured to pass a precursor gas therethrough. The annulus 84 positioned around the precursor tube 88 is configured to pass a shield or carrier gas around the precursor gas. In various embodiments, the shield or carrier gas may be inert to the precursor gas (e.g., diatomic nitrogen, noble gas, carbon dioxide). Typically, oxygen (e.g., from the surrounding air or environment) should not contact the precursor gas during the combustion process. If oxygen contacts the precursor gas, the resulting soot stream of the second plurality of particles 20B may touch down on the body 80 of the secondary burner 18 and deposit particles around precursor tube 88. Passing an inert gas, such as nitrogen, through the annulus 84 to form a shield around the precursor gas moves the reaction between the precursor gas and oxygen to a point sufficiently far from the secondary burner 18 to prevent soot deposition on the precursor tube 88. The precursor gas is configured to be ignited and combusted such that the second plurality of particles 20B is formed therefrom in a soot or gaseous form. The combustion of the precursor gas may form a self-sustaining flame such that the pilot holes 92 are, in essence, a safety feature and are optional. The precursor gas, which is passed through precursor tube 88, may include diatomic hydrogen, diatomic oxygen and an organic siloxane. The organic siloxane may include octamethylcyclotetrasiloxane ($[(CH_3)_2SiO]_4$) (OMCTS) or other siloxanes bonded with organic molecules. In another embodiment, the precursor gas may include Tetraethyl orthosilicate. In a specific example, the precursor gas of the secondary burner 18 may include about 41 SLPM of diatomic oxygen, between about 4.0 SLPM and about 13 SLPM of diatomic hydrogen and between about 0.5 g/min and about 3.0 g/min of OMCTS. It will be understood that the above ranges on flow rates are disclosed for a test scale apparatus and that the scale of the precursor gas may be increased with approximately the same ratio disclosed, or with varying ratios, without departing from the spirit of the disclosure.

The second plurality of particles 20B resulting from the combustion may exhibit a primary particle size, or a D50 diameter, of less than about 25 nm, 20 nm, 15 nm, 10 nm, 6 nm, 5 nm. It will be understood that the D50 diameter of the second plurality of particles 20B is to be distinguished from the size of aggregates formed from a plurality of the second particles 20B. The second plurality of particles 20B may exhibit a surface area of at least 100 $m^2/g$, 200 $m^2/g$, 225 $m^2/g$, 300 $m^2/g$ or 350 $m^2/g$. Depending on the precursor gas used, the second plurality of particles 20B may be composed of silicon, carbon, organics and/or other compounds. In an exemplary embodiment, the second plurality of particles 20B may be formed of $SiO_2$. In some embodiments, the precursor gas may include a doping agent (e.g., boron, germanium, erbium, titanium, aluminum, lithium, potassium, bromine, cesium, phosphorus, sodium, neodymium, bismuth, antimony, ytterbium) such that the second plurality of particles 20B may be doped. Combustion of the precursor gas creates an elevated temperature zone (e.g., a gradient of temperatures with the hottest point being proximate the combustion and the coldest point being distant from the flame) extending away from the secondary burner 18.

During formation of the particles (e.g., the second plurality of particles 20B), the D50 particle diameter is a function of the temperature of the combustion of the precursor gas and the time the particles spend at an elevated temperature (e.g., above about 500° C.). Formation of sub 50 nm particles typically is accomplished through a combination of low burner temperature and very short residence time within an elevated temperature zone. During formation of the second plurality of particles 20B, particle constituent molecules (e.g., $SiO_2$) nucleate into tiny particles and grow with the absorption of and collision with other constituent molecules. When the second plurality of particles 20B grow to a sufficient size, they collide to form clusters. The clusters can sinter at elevated temperatures to form large spherical particles. The relationship between the time a particle may spend in an elevated temperature based on a desired size is given by equation (1):

$$4\times10^{-12}\int e^{0.0184T(t)}dt=Z \quad (1)$$

where T is the temperature in degrees Celsius and time is measured in seconds. The integration is done over the time at which the temperature is above 500° C. When a particular time and temperature is chosen such that the value of Z=1, the D50 diameter of the particles is about 6 nm and the surface area is about 375 $m^2/g$. When the value of Z is 2, the D50 diameter of the particles is about 10 nm and the surface area is about 225 $m^2/g$. When the value of Z is 5, the D50 diameter of the particles is about 30 nm and the surface area is about 90 $m^2/g$. In specific examples, to obtain a particle of about 30 nm, a particle may be at a temperature of about 1650° C. for about 0.04 seconds, at 1550° C. for about 0.1 seconds, 1400° C. for about 1.5 seconds or above about 1300° C. for less than about 10 seconds. In specific examples, the second plurality of particles 20B may spend no more than about 10 seconds, 9 seconds, 8 seconds, 7 seconds, 6 seconds, 5 seconds, 4 seconds, 3 seconds, 2 seconds, less than 1 second, less than 0.1 seconds within the elevated temperature zone.

Control of the temperature of combustion (i.e. and therefore the temperature of the elevated temperature zone) and the residency time of the particles (e.g., the second plurality of particles 20B) within the elevated temperature zone may be controlled by controlling the flow rate of the precursor gas through the precursor tube 88. At low flow rates, heat from the combustion of the of the precursor gas is allowed to increase (e.g., above 1300° C., above 1400° C., above 1500° C., above 1600° C., above 1700° C. or above 1800° C.) and the time it takes the second plurality of particles 20B to move through the elevated temperature zone may also increase (e.g., greater than about 0.5 seconds, greater than about 1.0 seconds, greater than about 10 seconds). As the flow rate of the precursor gas is increased, the heat of the combustion may be dissipated and/or the combustion of the precursor gas may be incomplete leading to a lower combustion temperature (e.g., less than about 1600° C., less than about 1500° C., less than about 1400° C. or less than about 1300° C.). Additionally, as the precursor gas flow rate increases, the residency time of the second plurality of particles 20B within the elevated temperature zone decreases as the speed of the particles 20B increases. As such, the temperature of the combustion and the residency time of the particles 20B, and therefore the size of the particles 20B, may be controlled via the controller 52 by controlling the flow rate of the precursor gas using the gas flow restrictor 48. Accordingly, by increasing the precursor gas flow rate, the controller 52 may decrease the particle size, and by decreasing the precursor gas flow rate, the controller 52 may increase the particle size.

After generation of the second plurality of particles 20B, the particles 20B flow away from the secondary burner 18, down the secondary tube 30 and flow into the stream of the first plurality of particles 20A within the particle tube 22. The secondary tube 30 may be positioned downstream of the primary burner 14 sufficiently far enough that the second plurality of particles 20B is mixed into the first plurality of particles 20A out of the elevated temperature zone associated with the primary burner 14 such that sintering between the first and second pluralities of particles 20A, 20B does not occur. The flow of the second plurality of particles 20B into the first plurality of particles 20A, while both are carried by the exhaust and shield/carrier gasses, allows for an effective mixing the particles 20A, 20B at a molecular level. It will be understood that as described herein, mixing at the molecular level means mixing the particles sufficiently that there are not clumps of the second plurality of particles 20B in the gaseous cloud of the first plurality of particles 20A. The mixed first and second plurality of particles 20A, 20B then move down the particle tube 22 and are collected in the baghouse 26.

The production of the first plurality and second plurality of particles 20A, 20B at different diameters allows of the collection in the baghouse 26 of a bimodal silica soot. The term bimodal means that there is at least one minimum between two maxima of the particle size distribution. For example, as explained above, the primary burner 14 may produce the first plurality of particles 20A with a D50 diameter of greater than about 50 nm, and the secondary burner 18 may produce the second plurality of particles 20B at a D50 diameter of less than about 30 nm (e.g., about 7 nm), thus providing two maxima separated by a minimum.

Figure 4:
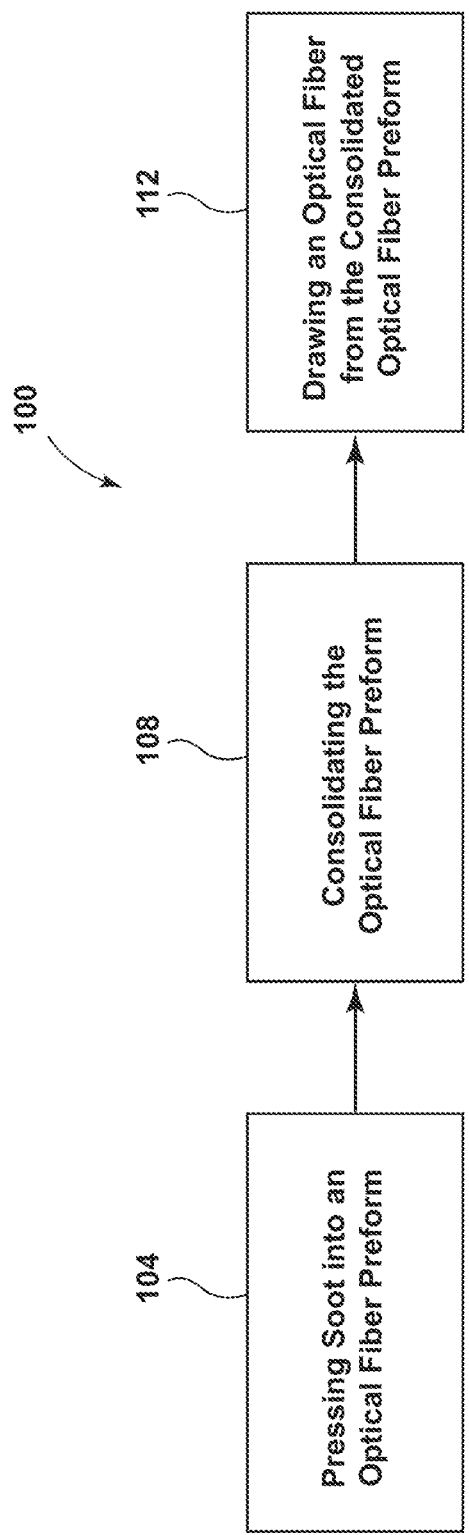
FIG. 4 is a flowchart illustrating a use of a soot generated by the particle production system, according to one embodiment.

Referring now to FIG. 4, an exemplary method 100 is depicted a use of the bimodal soot (e.g., the first and second pluralities of particles 20A, 20B) produced by the particle production system 10. The method 100 may include a step 104 of pressing the soot into an optical fiber preform, a step 108 of consolidating the optical fiber preform and a step 112 of drawing an optical fiber from the optical fiber preform. In optical fiber preform embodiments, the bimodal soot may be silica soot.

Step 104 of pressing the soot may utilize a radial press process to apply one or more layers of the soot, concentrically, to a substrate to form the optical fiber preform. The substrate may include a core region, which may be consolidated or unconsolidated core glass, without or without a layer of outside vapor deposited soot. In some embodiments, the substrate may include an optical fiber preform of unsintered soot. In some embodiments, the layers of soot may include a binder. The resultant body is a monolithic silica soot blank containing one layer or multiple concentric layers of pressed soot with a core. In multilayer embodiments, by selecting the porosity, surface area, and/or soot density of the soot used to form each of the pressed concentric layers, a multilayered, monolithic soot blank may be formed that includes outer cladding layers and optionally an inner cladding which have the same or different physical properties such as porosity, surface area, and/or soot density. Dopants may be added to the soot and may include, but are not limited to, chlorine, via use of $Cl_2$ or $SiCl_4$, fluorine, via use of $SiF_4$, $SF_6$, or $CF_4$, and phosphorus via use of $POCl_3$ or $PCl_3$ or combinations thereof. Optionally, the layers of pressed silica soot may have different chemical compositions, thus resulting in different refractive indexes across the various regions of pressed silica once those regions are consolidated. Soot compositions could include fluorine, boron, germanium, erbium, titanium, aluminum, lithium, potassium, bromine, cesium, chlorine, phosphorus, sodium, neodymium, bismuth, antimony, ytterbium, and combinations of these dopants, amongst other dopants in a silica matrix.

Pressing of the soot may include a series of radial pressing steps, each adding in sequence each radial segment of soot to form multiple sequential layers of soot differing in physical or compositional properties. Alternatively, more than one distinct layer can be provided in a single radial pressing step by fitting removable dividers into the cavity of a mold outside of the substrate, and extending the full axial length of the mold. One or more removable dividers can be positioned in the mold, either individually or as an assembly. The divider can be composed of any material that will sufficiently retain its shape and position during the soot fill and divider removal steps, such as, but not limited to, card stock, foil, Teflon, or high density polyethylene. The divider can form a boundary at one interface, or can be constructed as an assembly to provide a plurality of concentric layers.

Next, step 108 of consolidating the optical fiber preform is performed. Step 108 may include dehydrating, or drying, the optical fiber preform, and heating of the preform. The optical fiber preform may be heated to a temperature greater than about 800° C., 1000° C., 1200° C., or greater than about 1600° C. such that the pressed soot is allowed to sinter together, or consolidate. Isostatic pressure may be applied during the consolidation step. Next, step 112 of drawing an optical fiber from the consolidated optical fiber preform is performed. Step 112 may be performed using a fiber draw furnace and its associated hardware to produce an optical fiber.

It will be understood that a variety of advantages may be derived from use of this disclosure. For example, the efficient molecular mixing of the first and second plurality of particles 20A, 20b may be achieved through mixing of the exhaust gas from the primary and secondary burners 14, 18 eliminating the necessity for post-production mixing of the first and second plurality of particles 20A, 20B using a single set up. Further, the efficient molecular mixing disclosed herein provides material particularly well suited for pressing to form an optical fiber preform as explained above and below. Even further, the bimodal distribution of the silica particles may provide greater strength (e.g., increased tensile strength and/or reduced elastic modulus) to the optical fiber preform during preprocessing steps (e.g., drying, consolidation and/or preheating).

EXAMPLES

Figure 5:
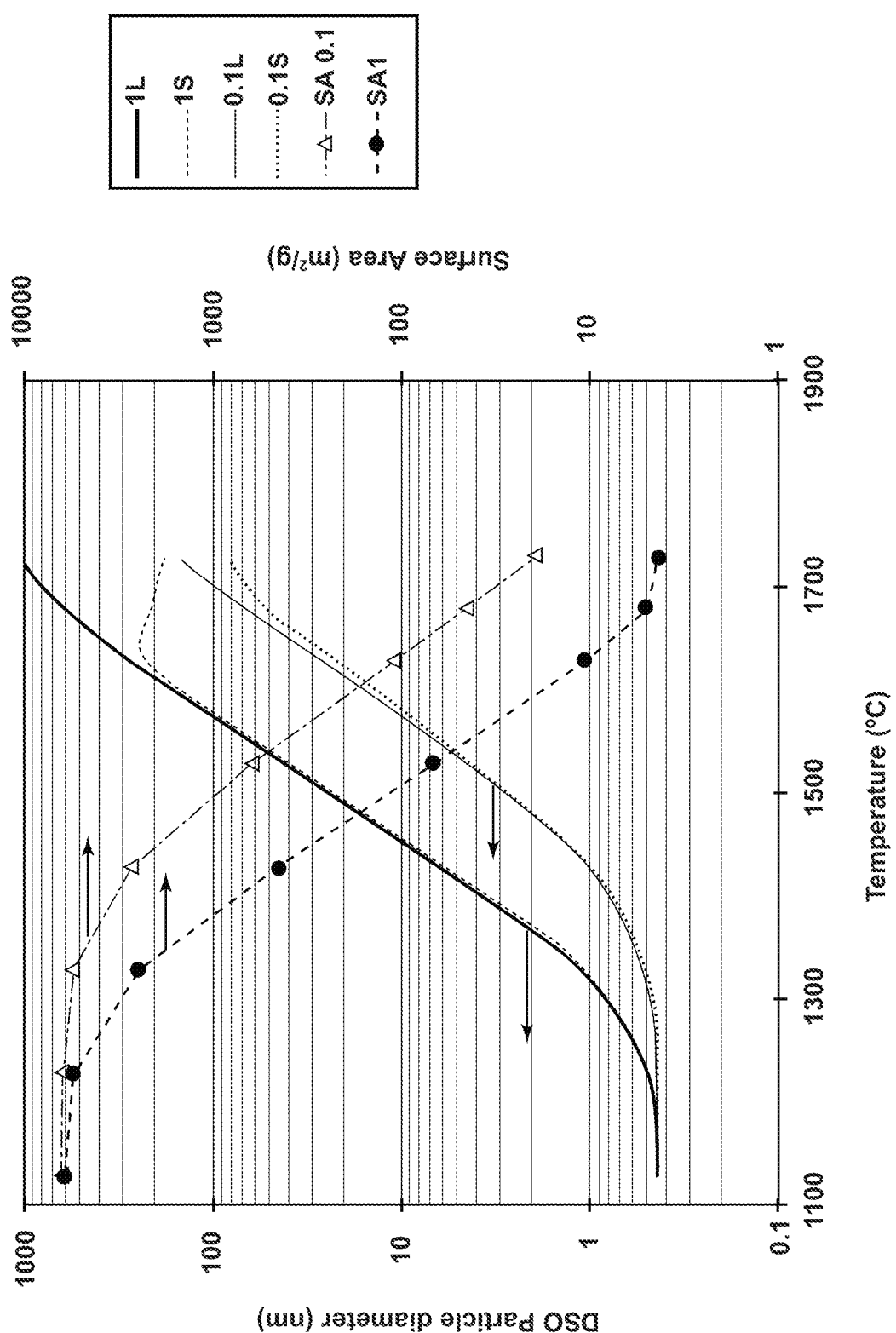
FIG. 5 is a graph depicting the attributes of particles produced based on time spent at an elevated temperature.

FIG. 5 depicts a graph of the diameter of particles (e.g., the second plurality of particles 20B) with respect to temperature for several different times and temperatures the particles undergo. The curves demonstrate the largest and smallest particles generated in a sample based on time at a temperature. For example, the largest particles produced after 1 second is given by the curve 1 L and the smallest particles produced at 0.1 seconds is given by the curve 0.1 S. Further, the average surface area of a sample for a given time at a temperature is provided. For example, the average surface area of a sample of particles after 1 second is given by the curve SA1. As can be seen, the distribution of particle sizes increases with increasing temperature and sharply divides after a threshold temperature is reached where particles begin to sinter together to form larger particles. Further, it can be seen that a low particle size and a high surface area per gram of sample (i.e., low particle size) is maintained at higher temperatures when the time is kept shorter. As can be seen, in order to generate sub 30 nm particles, the residence of the particles (e.g., the second plurality of particles 20B) should be less than 0.1 seconds at 1650° C., or less than 1 second at 1450° C.

Figure 6:
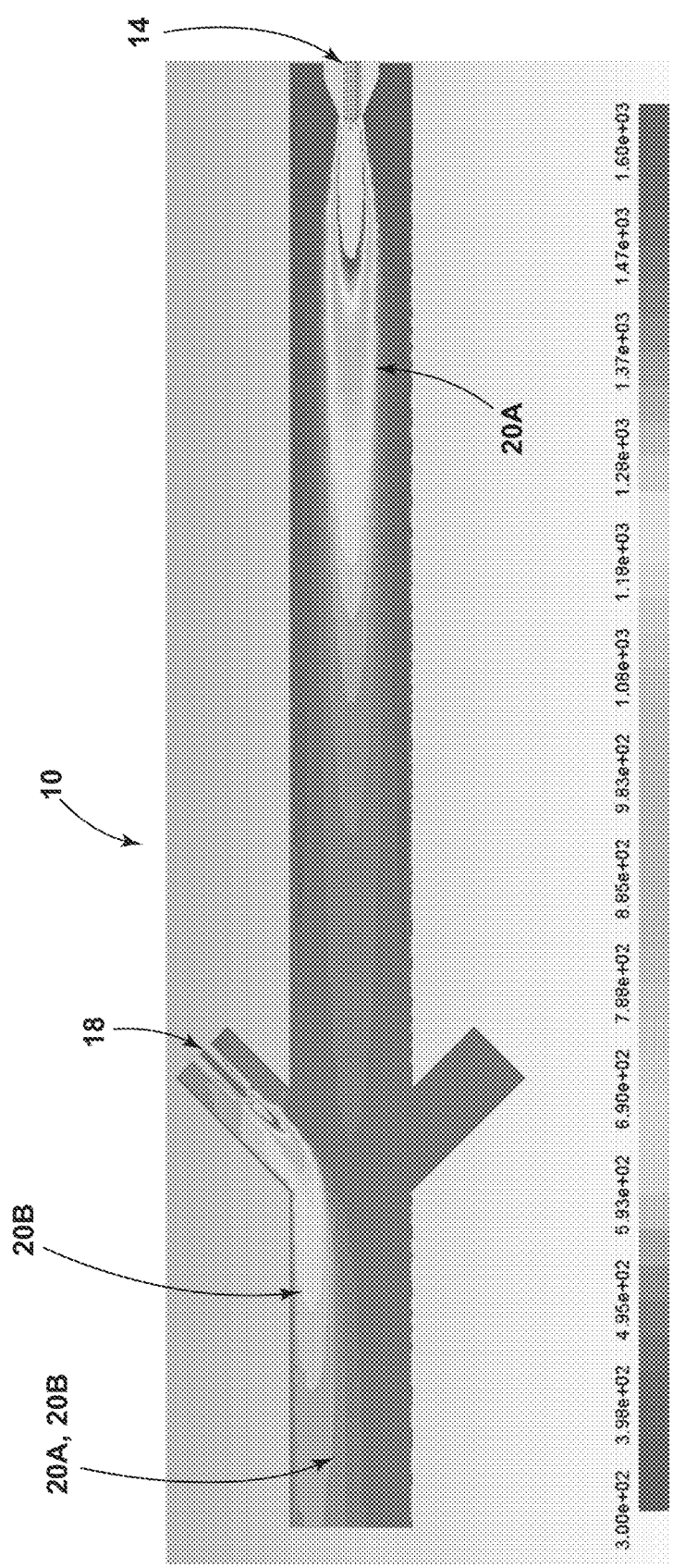
FIG. 6 depicts a fluid flow simulation of a burner configuration utilizing both a large particle burner and a small particle burner.

FIG. 6 depicts a fluid flow simulation of a large particle burner (e.g., the primary burner 14) and a small particle burner (e.g., the secondary burner 18). The small particle burner is configured to flow the exhaust gas and small particles (e.g., the second plurality of particles 20B) into the exhaust and large particles (e.g., the first plurality of particles 20A) of the large particle burner (e.g., the primary burner 14). As can be seen in the simulation, the majority of the small particle burner has a temperature below about 1600° C. such that the small particle burner is capable of producing sub 10 nm particles.

Figure 7:
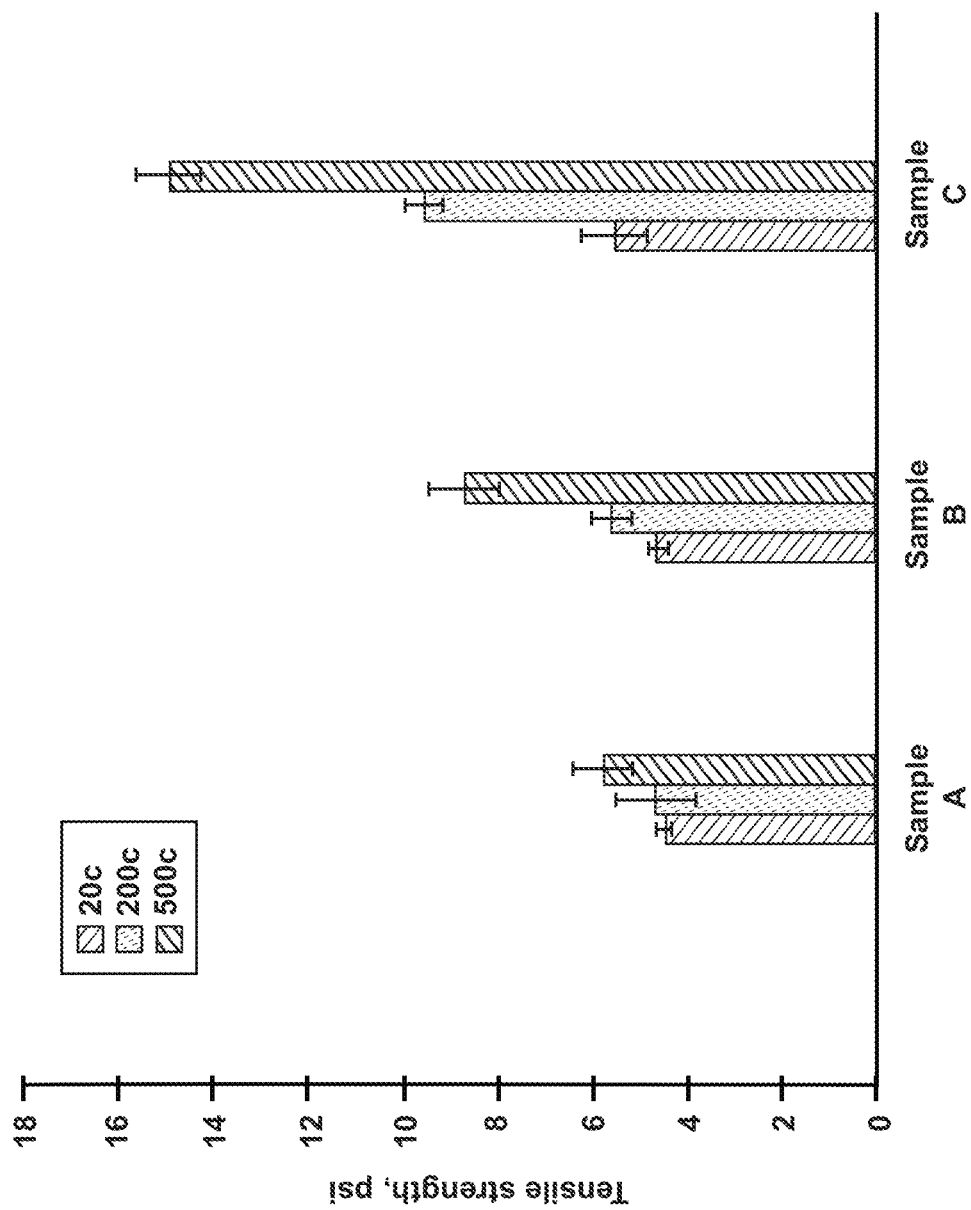
FIG. 7 depicts an the tensile strength of green bodies formed from particles made according to the present disclosure.

FIG. 7 depicts the tensile strength of a plurality of green bodies (e.g., unconsolidated optical fiber preforms) formed of small particles. Sample A consists of a plurality of silica particles having a surface area of 22 $m^2$/gram. Sample B consists of a bimodal silica having 7% by weight of 7 nm silica particles and the balance consisting of silica particles having a surface area of 22 $m^2$/gram with the different sizes of silica particles mixed after formation. Sample C consists of a bimodal silica having 7% by weight of 7 nm silica particles and the balance consisting of silica particles having a surface area of 22 $m^2$/gram with the different sizes of silica particles mixed proximate the time of formation consistent with the above disclosure. As can be seen, the use of bimodal silica that has been mixed at the time of formation increases the tensile strength of the green body at all of the temperatures tested compared to the uniform size of the silica particles of Sample A.

Figure 8:
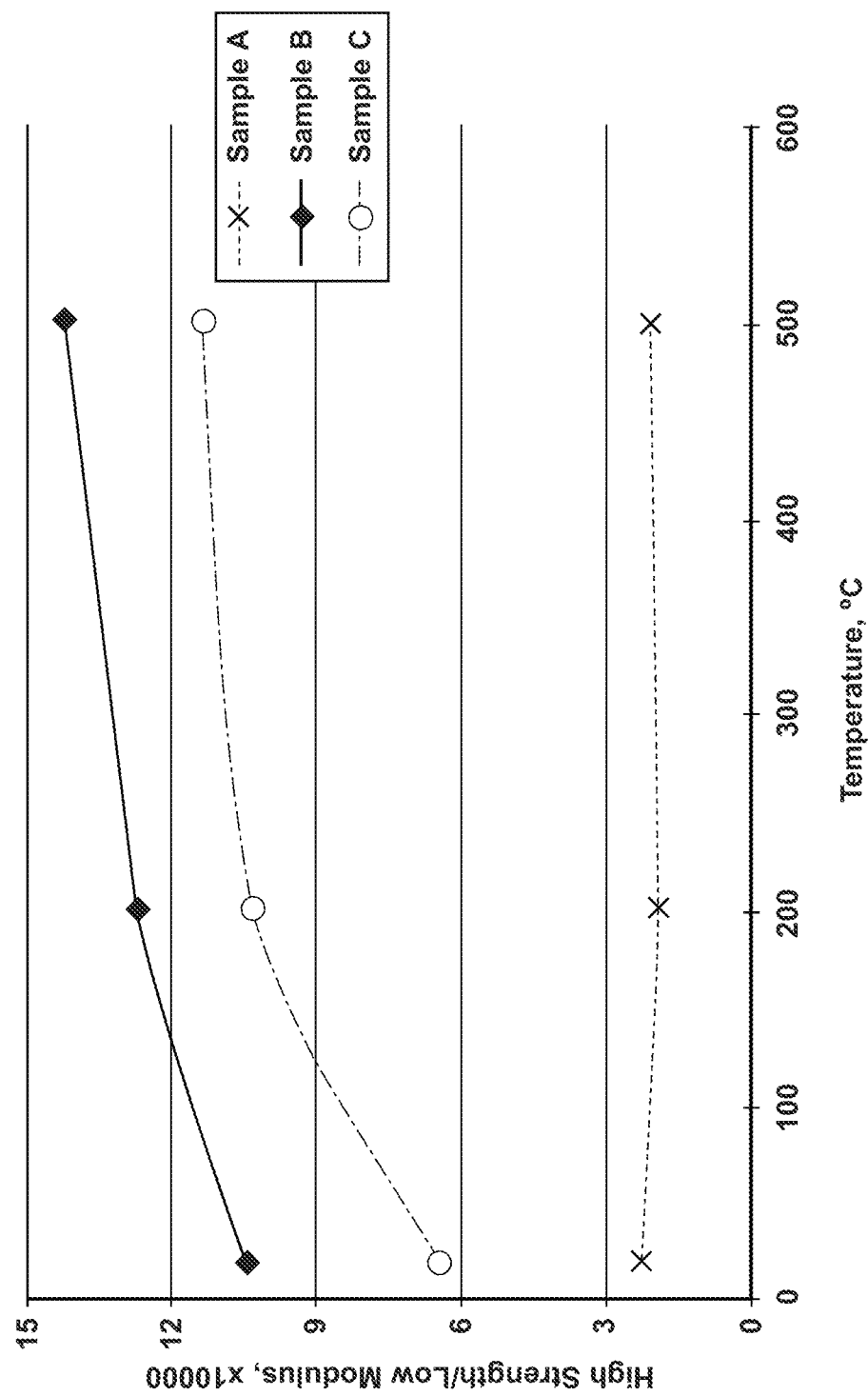
FIG. 8 depicts the strain tolerance of green bodies formed from particle made according to the present disclosure.

FIG. 8 depicts the strain tolerance of green bodies, or the strength divided by the modulus multiplied by 1,000. Samples A-C are consistent in particle size with the samples of FIG. 6. As can be seen, the strain tolerance of sample B is the highest over the given temperature range as compared to samples A and C. The strain tolerance of the samples is important as it helps control how the green body formed of the sample will perform during heating and sintering (e.g., consolidation of the optical fiber preform). The strain tolerance of the optical green body should be high such that the optical green body has good thermal survivability during consolidation. Other properties may also be important such as low contamination and high degrees of molecular mixing within the bimodal soot. The small particles (e.g., the second plurality of particles 20B) present may be in the form of agglomerates and tend to act like springs. When pressed the small particles may tend to bend. The bending of the small particles may give rise to a lower elastic modulus and thus gives the optical green body more resistance to breaking when stressed during consolidation.

It will be apparent to those skilled in the art that various modifications and variations can be made without departing from the spirit or scope of the claims.

What is claimed is:

1. A burner system, comprising:
   a primary burner positioned within a primary particle tube, the primary burner configured to produce a first plurality of particles;
   a secondary burner positioned within a secondary particle tube, the secondary burner configured to produce a second plurality of particles, wherein the secondary particle tube is positioned on the primary particle tube, and the primary particle tube and the secondary particle tube are fluidly connected such that the first plurality of particles and the second plurality of particles are mixed; and
   a bag house configured to collect the first and second plurality of particles.

2. The burner system of claim 1, wherein the second plurality of particles exhibit a particle D50 diameter of less than about 10 nm.

3. The burner system of claim 2, wherein the first plurality of particles exhibit a particle D50 diameter of greater than about 25 nm.

4. The burner system of claim 1, wherein the secondary particle part tube is positioned on the primary particle tube downstream of the primary burner.

5. The burner system of claim 1, wherein the secondary burner comprises a body and a precursor tube, the body defining an annulus around the precursor tube.

6. The burner system of claim 5, wherein the secondary burner comprises one or more pilot lights.

7. A burner system, comprising:
   a primary burner positioned within a primary particle tube, the primary burner configured to produce a first plurality of particles; and
   a secondary burner positioned within a secondary particle tube, the secondary burner configured to produce a second plurality of particles, wherein the secondary particle tube is positioned on and in fluid communication with the primary particle tube and the secondary particle tube is smaller than the primary particle tube.

8. The burner system of claim 7, wherein the second plurality of particles exhibit a particle D50 diameter of less than about 10 nm.

9. The burner system of claim 8, wherein the first plurality of particles exhibit a particle D50 diameter of greater than about 25 nm.

10. The burner system of claim 7, wherein the secondary particle tube is positioned on the primary particle tube downstream of the primary burner.

11. The burner system of claim 7, wherein the secondary burner comprises a body and a precursor tube, the body defining an annulus around the precursor tube.

12. The burner system of claim 11, wherein the secondary burner comprises one or more pilot lights.

13. The burner system of claim 7, further comprising:
   a bag house configured to collect the first and second plurality of particles.

* * * * *

UNITED STATES PATENT AND TRADEMARK OFFICE
CERTIFICATE OF CORRECTION

PATENT NO. : 11,667,558 B2
APPLICATION NO. : 16/740903
DATED : June 6, 2023
INVENTOR(S) : Laura Beth Cook et al.

It is certified that error appears in the above-identified patent and that said Letters Patent is hereby corrected as shown below:

In the Claims

In Column 10, Line 45, in Claim 4, after "particle" delete "part".

Signed and Sealed this
Twelfth Day of December, 2023

Katherine Kelly Vidal
Director of the United States Patent and Trademark Office